United States Patent [19]

Long

[11] 3,851,846
[45] Dec. 3, 1974

[54] SUPPORT AND LEVELING ARRANGEMENT
[75] Inventor: Olan L. Long, Columbus, Ohio
[73] Assignee: Westinghouse Electric Corporation, Pittsburgh, Pa.
[22] Filed: June 4, 1973
[21] Appl. No.: 366,839

[52] U.S. Cl............. 248/188.2, 403/106, 403/109, 403/350
[51] Int. Cl............................................ F16m 11/24
[58] Field of Search............. 248/188, 188.2, 188.3, 248/188.5, 188.8, 23, 157, 161, 166; 403/350, 383, 104, 109, 110, 377, 359

[56] References Cited
UNITED STATES PATENTS

| | | | |
|---|---|---|---|
| 2,397,382 | 3/1946 | Smith | 403/350 |
| 2,465,726 | 3/1949 | Hoffar | 403/350 |
| 2,591,999 | 4/1952 | Barham | 248/414 X |
| 2,784,769 | 3/1957 | Fisher | 248/188 UX |
| 2,949,692 | 8/1960 | Kuhn | 403/359 X |
| 3,514,570 | 5/1970 | Bernard et al. | 403/350 |

FOREIGN PATENTS OR APPLICATIONS

| 168,411 | 9/1921 | Great Britain | 403/110 |
|---|---|---|---|

Primary Examiner—Roy D. Frazier
Assistant Examiner—Robert W. Gibson, Jr.
Attorney, Agent, or Firm—E. C. Arenz

[57] ABSTRACT

An arrangement which provides support for and permits leveling of a major appliance, such as a dishwasher, in which an adjustable leg having an oval shaped cross-section fits in a bore having a similar oval shaped cross-section so that the leg is axially slidable when the oval shaped cross-sections are in registry, and the leg can be locked in an axially adjusted position by rotating the leg in the bore to obtain an interference lock.

3 Claims, 4 Drawing Figures

PATENTED DEC 3 1974  3,851,846

SUPPORT AND LEVELING ARRANGEMENT

BACKGROUND OF THE INVENTION

1. Field of the Invention

This invention pertains to the art of adjustable legs used, for example, to support devices which require leveling.

2. Description of Prior Art

None of the prior art of which applicant is aware is considered pertinent to the invention. However, patents which illustrate some known adjustable supporting legs are as follows: U.S. Pat. Nos. 3,104,493; 1,798,513; 1,549,144.

SUMMARY OF THE INVENTION

In accordance with the invention, the support and leveling arrangement comprises a leg and means forming a socket in which the leg is received for axial adjustment, with at least a part of the length of the socket being generally oval shaped in cross-section, and at least that part of the leg which will be in facing relation with the socket oval shaped cross-section in the range of adjustment also being generally oval shaped in cross-section. The oval shaped cross-sections are dimensioned so that, when in registry, relatively free axial movement of the leg within socket is permitted, and when the leg is rotated sufficiently in the socket, an interference lock between the parts is effected. Lever arm means on the leg, preferably in the form of a foot and a toe, facilitate rotation of the leg.

DESCRIPTION OF THE PREFERRED EMBODIMENT

Figures 1, 2:
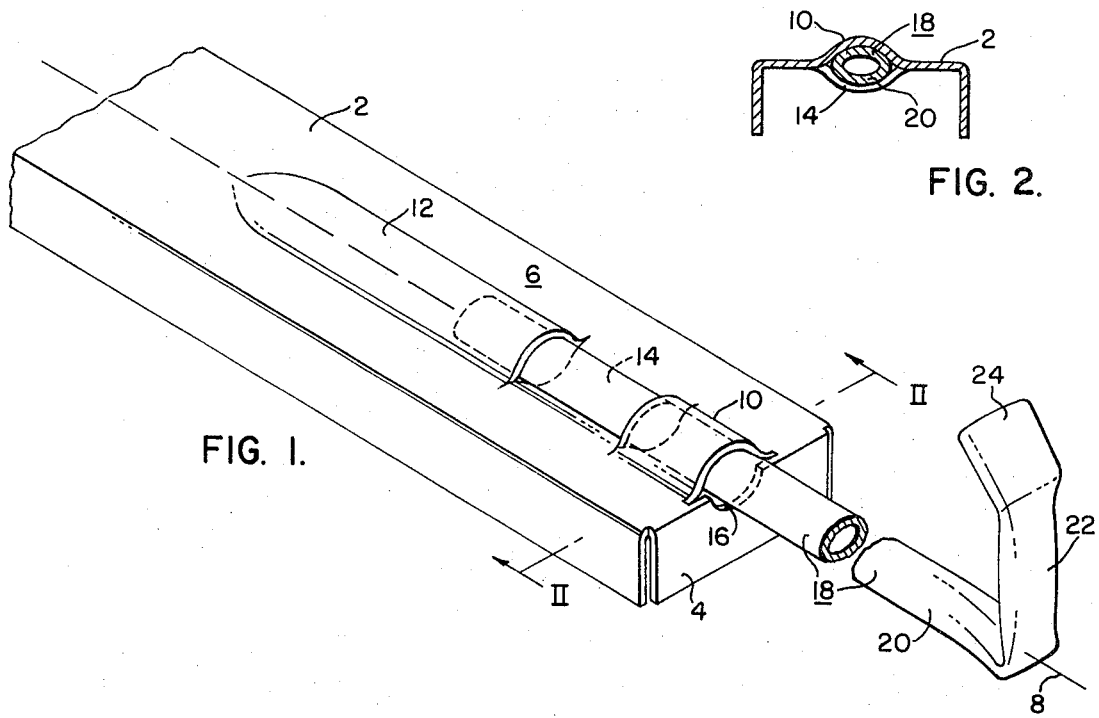
FIG. 1 is an isometric view of an arrangement according to the invention and in which the leg is in an extended position, and with the oval shaped cross-sections in registry.
FIG. 2 is a sectional view corresponding to one taken along line II—II of FIG. 1.

The arrangement according to the invention is shown in FIG. 1 as applied to the lower end of one of the main support legs 2 of a dishwasher, the upper end of the leg typically being attached to a dishwasher tub (not shown). The main support leg is manufactured from a metallic channel. At the bottom of the support leg, an extended portion 4 of the web is then bent 90° to the plane of the web to enclose the end of the channel. A socket 6 extending along a longitudinal axis 8 (shown in dashed lines in FIG. 1) of the channel is formed in the following way. Three separate lengths of the web along axis 8 are drawn out of the plane of the web to form the oval shaped bore of the socket. Lengths 10 and 12 are drawn, as shown in FIG. 1, upwardly out of the plane of the web, while intermediate length 14 is drawn in a similar manner downwardly out of the plane of the web. A half hole having semi-oval shape is cut in end 4.

The spaced apart lengths 10 and 12 form one side of the bore 17, and length 14 and the edge 16 of the half hole in the end 4 form the opposite side of a bore, having when viewed in an axial direction, an oval shaped cross-section symmetric about axis 8.

The adjustable leg 18 shown in FIG. 1 is formed from a metal tube which is oval shaped in cross-section. In the preferred form, the tube is bent in the shape of an L with an axial part 20, a foot 22, and a toe 24. The axial part 20 of the leg is dimensioned to fit slidably in the bore 17 of the socket 6 when the oval shaped cross-sections of the leg and the bore are in registry, as illustrated in FIG. 2. Positioning the leg with respect to the socket by moving the leg in or out of the socket provides the axial adjustment necessary for leveling purposes. The range of axial adjustment can be limited on one end by the 90° turn in the leg and on the other end by the minimum length of interference between the leg and the socket required to support a particular load.

Figures 3, 4:
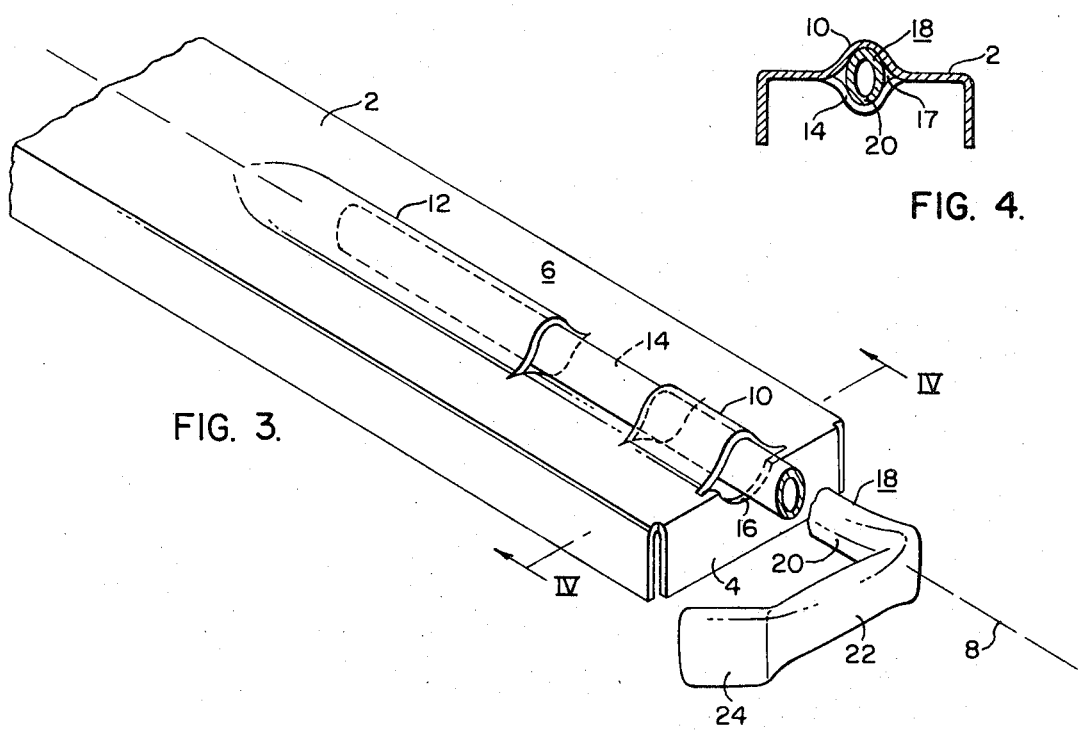
FIG. 3 is an isometric view of the arrangement with the leg in an axially withdrawn position, and with the oval shaped cross-sections in the locked position.
FIG. 4 is a sectional view corresponding to one taken along line IV—IV of FIG. 3.

When a desired axial position is established, the leg can be locked in this adjusted position by rotating the adjustable leg 18 in either direction with respect to the socket. FIG. 3 shows the adjustable leg rotated 90° from the position shown in FIG. 1 with respect to the socket. Rotation of the leg is accomplished by exerting force on a foot 22 which functions as a lever arm and converts the rotational force to a moment acting about axis 8. In the preferred embodiment, the upwardly inclined toe 24 at the end of the foot can serve both as a skid, as well as a handle for turning the leg when the foot is resting on the floor.

With the parts in the position shown in FIG. 3, movement of the adjustable leg 18 with respect to the socket 6 is prevented by the locking force arising from the interference of the oval shaped cross-section of the axial part 20 of the leg with the oval shaped cross-section of the bore 17 of the socket, as illustrated in FIG. 4.

The total locking force available with a given construction will depend in part upon the length of leg in socket, and in part upon the degree the leg is rotated in the socket. The locking force from rotation is maximum in the FIG. 4 position. The required locking force, and correspondingly, the amount of interference between the parts, is determined by the particular load expected to be supported and can be varied accordingly.

To release the leg from a particular position for readjustment following movement of the supported appliance, the procedure described above is reversed. That is, the adjustable leg 18 is rotated from the FIG. 4 position by applying a force to the foot 22 of the leg, returning the adjustable leg to the FIG. 2 position with respect to the socket 6.

The invention is not limited to the application described above. For example, the lever used to effect rotation of the adjustable leg does not have to serve as the foot of the leg. The lever could be attached to the adjustable leg in various positions along the axial part, and the bottom of the axial part of the leg could then be attached to a pad or a foot. Since the adjustable leg is only required to be oval shaped in cross-section in the range of adjustment, an alternate construction which would embody this arrangement would be comprised of a lever arm means attached to an axial part of the adjustable leg, which, in the range of adjustment, would be constructed similarly to commercial roll pins, that is, being a hollow metal cylinder having a lapped seam which provides spring resistance to cross-sectional compressive loads, but would differ from commercial roll pin type construction in that it would be oval shaped in cross-section rather than circular. The adjustable leg could also be made from a metal rod having an oval shaped cross section.

I claim:

1. A support and leveling arrangement comprising an adjustable leg portion;

a socket for receiving said adjustable leg portion and having a generally oval shaped cross section, said socket formed intergral with and deformed from a web and comprised of one semi-oval band projecting out of said web in one direction and a pair of upstanding semi-oval bands located on either side of said one band and projecting out of said web in the other direction;

said adjustable leg portion having a longitudinal member having a substantially oval cross section along at least a part of its length, said adjustable leg portion being relatively freely movable axially in said socket when the oval cross sections of said socket and said adjustable leg portion are in registry, said oval cross sections of said socket and said adjustable leg portion providing an interference lock between said socket portion and said adjustable leg portion in any adjusted position of said adjustable leg portion when said adjustable leg portion is rotated relative to said socket portion;

and means for rotating said adjustable leg portion relative to said socket portion.

2. A support and leveling arrangement comprising:

a leg having a top and bottom end;

means forming an axially extending socket in which said leg is received for axial adjustment therewithin, said socket formed intergral with and deformed from a web and comprised of one semi-oval band projecting out of said web in one direction and a pair of upstanding, semi-oval bands located on either side of said one band and projecting out of said web in the other direction, said socket having in its projected cross section a generally oval shape;

said leg having along at least that part of its length subject to being in facing relation with said socket in the range of adjustment of said leg relative to said socket, a generally oval shaped cross section of a transverse dimension permitting relatively free axial movement of said leg within said socket when said oval shaped cross sections are in registry, and providing an interference lock between said leg and socket when said leg is rotated relative to said socket;

and a foot extending generally at a right angle at said bottom end of said leg for facilitating rotation of said leg within said socket.

3. The arrangement of claim 2 wherein:

said foot includes an upwardly inclined toe to facilitate rotation of said leg when said leg is resting on a surface.

* * * * *